US012611817B2

(12) United States Patent　　　(10) Patent No.:　US 12,611,817 B2
Mykulowycz et al.　　　　　　　　 (45) Date of Patent:　　Apr. 28, 2026

(54) BONDING METHODS FOR LAMINATED LIGHT ALLOY PARTS

(71) Applicant: Alloy Enterprises, Inc., Burlington, MA (US)

(72) Inventors: Nicholas Mykulowycz, Boxford, MA (US); Alison Forsyth, Somerville, MA (US); Jason Kovacs, Somerville, MA (US); Lyle Cheatham, Marblehead, MA (US)

(73) Assignee: Alloy Enterprises Inc., Burlington, MA (US)

( * ) Notice: Subject to any disclaimer, the term of this patent is extended or adjusted under 35 U.S.C. 154(b) by 0 days.

(21) Appl. No.: 18/502,015

(22) Filed: Nov. 5, 2023

(65) Prior Publication Data

US 2024/0066791 A1　　Feb. 29, 2024

Related U.S. Application Data

(63) Continuation of application No. 17/928,760, filed as application No. PCT/US2021/036770 on Jun. 10, (Continued)

(51) Int. Cl.
B29C 64/147　　　(2017.01)
B23K 1/20　　　　(2006.01)
(Continued)

(52) U.S. Cl.
CPC .......... B29C 64/147 (2017.08); B29C 64/223 (2017.08); B33Y 10/00 (2014.12);
(Continued)

(58) Field of Classification Search
CPC ........................... B29C 64/147; B23P 2700/12
See application file for complete search history.

(56) References Cited

U.S. PATENT DOCUMENTS 4,752,352 A　*　6/1988　Feygin ................... B23K 26/08
29/430
5,745,834 A　　 4/1998　Bampton et al.
(Continued)

FOREIGN PATENT DOCUMENTS

DE　　102019129280 A1　*　5/2021
EP　　　　0838300 A2　　 4/1998
(Continued)

OTHER PUBLICATIONS

DE-102019129280-A1 machine translation (Year: 2021).*
(Continued)

*Primary Examiner* — Michael W Hotchkiss
(74) *Attorney, Agent, or Firm* — Danielson Legal LLC

(57)　　　　　ABSTRACT

A method for the additive manufacturing of an object and a system for manufacturing an object. The method includes depositing a second foil sheet onto the first foil sheet, wherein the first foil sheet and the second foil sheet each comprise a structural layer, forming a layer stack comprising the first foil sheet and the second foil sheet, the layer stack comprising an object section and at least one support section configured to enclose the object section in the layer stack, and applying at least one of heat or pressure to opposite sides of the layer stack with a first plate and a second plate, wherein applying the at least one of heat or pressure increases the temperature of the layer stack to a temperature lower than the melting temperature of the structural layer, and the at least one of heat or pressure bonds the first foil sheet to the second foil sheet in the layer stack, the first plate and the second plate are in contact with the at least one support section, and the at least one support section is configured to conduct the at least one of heat or pressure through the layer stack to the object section.

29 Claims, 12 Drawing Sheets

Related U.S. Application Data 2021, now abandoned, which is a continuation-in-part of application No. PCT/US2021/030879, filed on May 5, 2021.

(60) Provisional application No. 63/037,220, filed on Jun. 10, 2020.

(51) Int. Cl.

| | |
|---|---|
| *B23K 20/02* | (2006.01) |
| *B23K 20/10* | (2006.01) |
| *B29C 64/223* | (2017.01) |
| *B29K 105/00* | (2006.01) |
| *B32B 15/01* | (2006.01) |
| *B32B 15/20* | (2006.01) |
| *B32B 37/06* | (2006.01) |
| *B33Y 10/00* | (2015.01) |
| *B33Y 30/00* | (2015.01) |
| *B33Y 70/00* | (2020.01) |

(52) U.S. Cl.

CPC .............. *B33Y 30/00* (2014.12); *B33Y 70/00* (2014.12); *B23K 1/20* (2013.01); *B23K 20/021* (2013.01); *B23K 20/023* (2013.01); *B23K 20/10* (2013.01); *B23P 2700/12* (2013.01); *B29K 2105/256* (2013.01); *B32B 15/01* (2013.01); *B32B 15/20* (2013.01); *B32B 37/06* (2013.01)

(56) References Cited

U.S. PATENT DOCUMENTS

| | | | | |
|---|---|---|---|---|
| 5,876,550 | A | 3/1999 | Feygin | |
| 6,324,438 | B1 * | 11/2001 | Cormier | C08J 5/122 |
| | | | | 700/98 |
| 6,413,360 | B1 * | 7/2002 | Morita | B32B 38/10 |
| | | | | 156/583.1 |
| 6,519,500 | B1 | 2/2003 | White | |
| 6,575,218 | B1 | 6/2003 | Burns | |
| 6,672,502 | B1 | 1/2004 | Paul et al. | |
| 6,682,688 | B1 | 1/2004 | Higashi et al. | |
| 9,656,344 | B2 | 5/2017 | Kironn et al. | |
| 9,950,467 | B2 * | 4/2018 | Mironets | B29C 65/02 |
| 10,293,589 | B2 | 5/2019 | Larsen et al. | |
| 2007/0181259 | A1 * | 8/2007 | Bar-Erez | B29C 64/147 |
| | | | | 156/578 |
| 2009/0039570 | A1 * | 2/2009 | Clark | B29C 64/153 |
| | | | | 264/653 |
| 2009/0214890 | A1 * | 8/2009 | Lowney | B22D 17/22 |
| | | | | 228/208 |
| 2010/0055491 | A1 | 3/2010 | Vecchio et al. | |
| 2010/0147497 | A1 | 6/2010 | Furman et al. | |
| 2012/0285617 | A1 | 11/2012 | Azami et al. | |
| 2013/0001782 | A1 | 1/2013 | Otsuka et al. | |
| 2013/0171431 | A1 * | 7/2013 | Swartz | B29C 64/141 |
| | | | | 156/499 |
| 2014/0271961 | A1 * | 9/2014 | Khoshnevis | B28B 1/001 |
| | | | | 425/375 |
| 2015/0083369 | A1 | 3/2015 | Fryer et al. | |
| 2015/0136318 | A1 * | 5/2015 | Tiefel | B29C 66/342 |
| | | | | 156/272.8 |
| 2015/0321417 | A1 | 11/2015 | Mironets | |
| 2016/0144568 | A1 * | 5/2016 | MacCormack | B29C 64/112 |
| | | | | 156/367 |
| 2017/0014954 | A1 * | 1/2017 | Pomerantz | B33Y 70/00 |
| 2017/0297098 | A1 * | 10/2017 | Myerberg | B22F 3/22 |
| 2018/0072001 | A1 | 3/2018 | Swartz et al. | |
| 2018/0207924 | A1 | 7/2018 | Wu | |
| 2018/0229332 | A1 * | 8/2018 | Tsai | B23K 26/082 |
| 2019/0126538 | A1 * | 5/2019 | Fujita | B29C 64/218 |
| 2019/0160735 | A1 | 5/2019 | Prakash et al. | |
| 2019/0193333 | A1 | 6/2019 | Braunroth | |
| 2019/0275779 | A1 | 9/2019 | Tanigawa et al. | |
| 2019/0344381 | A1 * | 11/2019 | Pomerantz | B29C 64/223 |
| 2020/0001398 | A1 | 1/2020 | Mellor et al. | |
| 2020/0247045 | A1 | 8/2020 | Giacobbi | |
| 2022/0088854 | A1 | 3/2022 | Zenou | |
| 2023/0115820 | A1 | 4/2023 | Yumoto et al. | |

FOREIGN PATENT DOCUMENTS

| | | | |
|---|---|---|---|
| EP | 0775550 A1 | 2/2001 | |
| EP | 3659806 A1 * | 6/2020 | B23P 23/04 |
| WO | 2018089080 A1 | 5/2018 | |

OTHER PUBLICATIONS

International Search Report for PCT/US2021/036770, Sep. 27, 2021, 2 pages.

Written Opinion for PCT/US2021/036770, Sep. 27, 2021, 4 pages.

Office Action for U.S. Appl. No. 17/928,760, dated Jun. 28, 2023, 28 pages.

Extended European search report for EP21821965.7, 10 pages, Nov. 8, 2024.

Notice of deficiencies for Israel Pat. Appl. No. 298916, 3 pages, May 19, 2025.

* cited by examiner

205

245     215

210

225

405

445

435

425

410

605

610

615

635

630

625

650

900

Applying heat to a stack of
foil sheets

905

Applying pressure to a stack
of foil sheets

910

Bringing the foil sheets up
to bonding temperature

915

Adding a foil to an object

920

Holding the foil sheets at
bonding temperature

925

Forming an object region

930

1000

1100

1200

BONDING METHODS FOR LAMINATED LIGHT ALLOY PARTS

CROSS REFERENCE TO RELATED APPLICATIONS

The present application is a continuation of U.S. patent application Ser. No. 17/928,760, filed on Nov. 30, 2022, which itself is a national phase application of International (PCT) Patent Application No. PCT/US2021/036770, filed internationally on Jun. 10, 2021, which itself claims the benefit of and priority to U.S. Provisional Application No. 63/037,220, filed on Jun. 10, 2020, and is a continuation-in-part of International (PCT) Patent Application No. PCT/US2021/030879, filed internationally on May 5, 2021, the entire disclosure of each of which is hereby incorporated by reference as if set forth in their entirety herein.

TECHNICAL FIELD

Embodiments described herein relate to methods and systems for fabricating an object and, more particularly but not exclusively, to methods and systems for additively manufacturing foil sheet stacks from foil sheets having structural layers and interlayer material layers with different melting points.

BACKGROUND

In traditional laminated object manufacturing ("LOM"), assembling complex 3D structures involves sequentially adding layers of material to a structure and using an adhesive to adhere layers together. Often these layers are cut or shaped prior to being incorporated into the part. The layers may comprise a wide variety of materials, including metals. This is sufficient for plastic and paper laminated object manufacturing because plastic and paper parts typically are not subjected to high forces or loads.

This approach includes complicated process controls required to precisely deposit the adhesive and manufacturing equipment to account for the adhesive, and the adhesive bonds may not be as strong as metallic bonds for metal parts. A final manufactured adhesive-metal part may not have the same mechanical properties as its constituent metal layers and may not be suitable for as many applications.

Furthermore, the joining process for metal layers requires the process be conducted under an inert, or non-oxidizing, atmosphere to prevent surface oxidation on the constituent metal foil sheets or part. Surface oxide groups may inhibit or otherwise slow down the bonding process and produce lower strength bonds.

A need therefore exists for methods and systems to improve additive manufacturing processes.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for additive manufacturing of an object. In some embodiments, the method includes depositing a first foil sheet; depositing a second foil sheet onto the first foil sheet, wherein the first foil sheet and the second foil sheet each include a structural layer; forming a layer stack including the first foil sheet and the second foil sheet, the layer stack including an object section and at least one support section configured to enclose the object section in the layer stack; and applying at least one of heat or pressure to opposite sides of the layer stack with a first plate and a second plate, wherein: applying the at least one of heat or pressure increases the temperature of the layer stack to a temperature lower than the melting temperature of the structural layer; the at least one of heat or pressure bonds the first foil sheet to the second foil sheet in the layer stack; the first plate and the second plate are in contact with the at least one support section; and the at least one support section is configured to conduct the at least one of heat or pressure through the layer stack to the object section.

In some embodiments, the first foil sheet is bonded to the second foil sheet using transient liquid phase diffusion bonding.

In some embodiments, the first foil sheet is bonded to the second foil sheet using brazing.

In some embodiments, the first plate and the second plate are not in contact with the object section.

In some embodiments, at least one of the first foil sheet and the second foil sheet include an interlayer material layer; and the temperature of the layer stack is greater than the melting temperature of the interlayer material layer when bonding the first foil sheet to the second foil sheet.

In some embodiments, at least one of the first foil sheet and the second foil sheet include an interlayer material; and the temperature of the layer stack is less than the melting temperature of the interlayer material layer when bonding the first foil sheet to the second foil sheet.

In some embodiments, no powder is deposited on the first foil sheet or the second foil sheet to promote bonding.

In some embodiments, the structural layer includes at least one of aluminum, magnesium, titanium, aluminum alloy, magnesium alloy, or titanium alloy.

In some embodiments, the interlayer material layer includes at least one of aluminum, copper, lithium, magnesium, silicon, zinc, aluminum alloy, magnesium alloy, or titanium alloy.

In some embodiments, the first plate and the second plate are heated or pressurized plates.

In some embodiments, at least one of the first foil sheet or the second foil sheet is a patterned foil sheet, wherein the pattern is configured to create microscopic voids between the foil sheets in the layer stack.

In some embodiments, the method further includes deforming the microscopic voids and bonding the first foil sheet to the second foil sheet without surface oxides.

In some embodiments, the method further includes sanding at least one of the first foil sheet or the second foil sheet before bonding the first foil sheet to the second foil sheet.

In some embodiments, the first foil sheet includes a first object region and a first support region connected to the first object region; the second foil sheet includes a second object region and a second support region connected to the second object region; and the method further includes: attaching the second object region to the first object region; and attaching the first support region to the second support region, the first support region and the second support region including the at least one support section.

In some embodiments, the layer stack includes a top layer, at least one middle layer, and a bottom layer; the at least one middle layer includes an object region and a first support region; the top layer is a second support region; the bottom layer is a third support region; and the first support region, the second support region, and the third support region are configured to enclose the object region in the layer stack.

In another aspect, embodiments relate to a system for manufacturing an object. In some embodiments, the system includes an additive manufacturing device configured to: deposit a first foil sheet; deposit a second foil sheet onto the first foil sheet, wherein the first foil sheet and the second foil sheet each include a structural layer; and form a layer stack including the first foil sheet and the second foil sheet, the layer stack including an object section and at least one support section configured to enclose the object section in the layer stack; and at least one of heated or pressurized plates configured to: contact the at least one support section; and apply at least one of heat or pressure to opposite sides of the layer stack, wherein: the at least one support section is configured to conduct the at least one of heat or pressure through the layer stack to the object section; applying the at least one of heat or pressure increases the temperature of the layer stack to a temperature lower than the melting temperature of the structural layer; and the at least one of heat or pressure bonds the first foil sheet to the second foil sheet in the layer stack.

In some embodiments, the at least one of heat or pressure bonds the first foil sheet to the second foil sheet in the layer stack using transient liquid phase diffusion bonding.

In some embodiments, the at least one of heat or pressure bonds the first foil sheet to the second foil sheet in the layer stack using brazing.

In some embodiments, at least one of heated or pressurized plates are not in contact with the object section.

In some embodiments, at least one of the first foil sheet and the second foil sheet include an interlayer material layer; and the temperature of the layer stack is greater than the melting temperature of the interlayer material layer when the first foil sheet bonds to the second foil sheet.

In some embodiments, at least one of the first foil sheet and the second foil sheet include an interlayer material; and the temperature of the layer stack is less than the melting temperature of the interlayer material layer when the first foil sheet bonds to the second foil sheet.

In some embodiments, no powder is deposited on the first foil sheet or the second foil sheet to promote bonding.

In some embodiments, the structural layer includes at least one of aluminum, magnesium, titanium, aluminum alloy, magnesium alloy, or titanium alloy.

In some embodiments, the interlayer material layer includes at least one of aluminum, copper, lithium, magnesium, silicon, zinc, aluminum alloy, magnesium alloy, or titanium alloy.

In some embodiments, at least one of the first foil sheet or the second foil sheet is a patterned foil sheet, wherein the pattern is configured to create microscopic voids between the foil sheets in the layer stack.

In some embodiments, the additive manufacturing device is configured to deform the microscopic voids; and the at least one of heated or pressurized plates are configured to bond the first foil sheet to the second foil sheet without surface oxides.

In some embodiments, the system further includes a sander configured to sand at least one of the first foil sheet or the second foil sheet.

In some embodiments, the first foil sheet includes a first object region and a first support region connected to the first object region; the second foil sheet includes a second object region and a second support region connected to the second object region; and the additive manufacturing device is further configured to: attach the second object region to the first object region; and attach the first support region to the second support region, the first support region and the second support region including the at least one support section.

In some embodiments, the layer stack includes a top layer, at least one middle layer, and a bottom layer; the at least one middle layer includes an object region and a first support region; the top layer is a second support region; the bottom layer is a third support region; and the first support region, the second support region, and the third support region are configured to enclose the object region in the layer stack.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
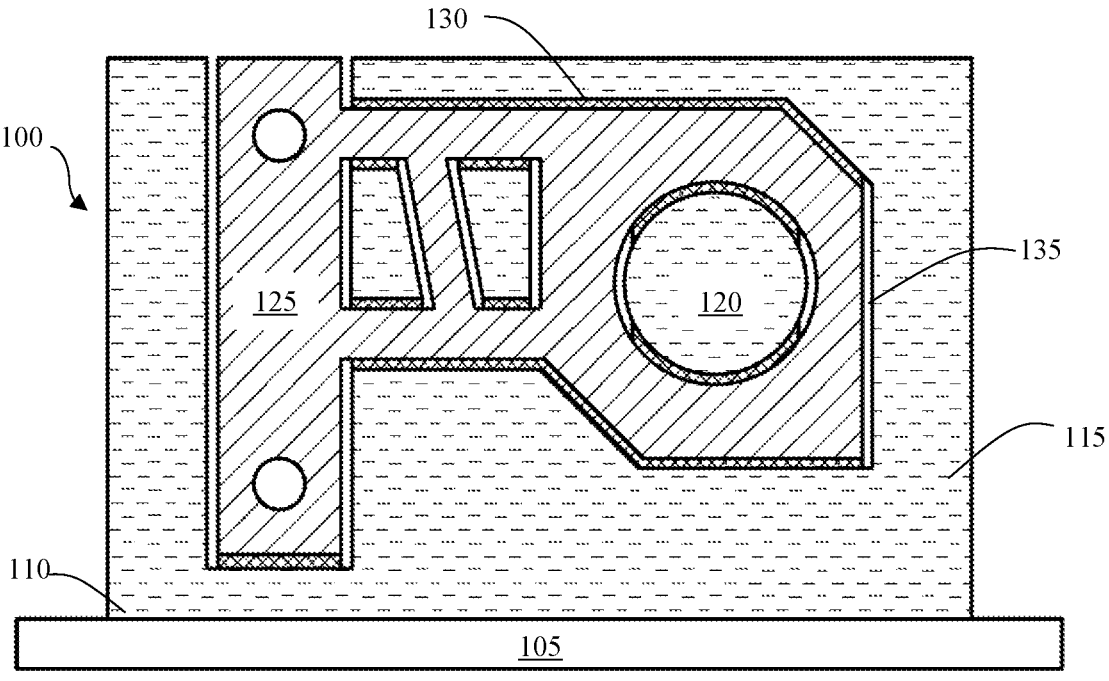
FIG. 1 depicts a side view cross section of a metal laminated object manufactured in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments described herein relate to methods and systems to enable the fabrication of complex geometries using metal LOM. In some embodiments, LOM bonds patterned sheets of foil together to form metal objects with strength equivalent to machined objects. In some embodiments, object-processing time and/or cost may be reduced because the use of appropriate selective inhibition support strategies allows objects with more complex geometries to be fabricated via LOM techniques as a comprehensive manufacturing strategy.

In some embodiments, "selective inhibition" describes a strategy where a material is deposited, removed, or altered to prevent bonding in specific areas on any number of foil sheets that comprise the manufactured object. In some embodiments, these patterned foil sheets are configured to be stacked to form an object and its supporting structure simultaneously. In some embodiments, systems may use a bonding method to form strong metallic bonds in non-inhibited places between adjacent foil sheets. In some embodiments, a system may quench and homogenize the object to finish the object. In some embodiments, the system may employ a removal technique to separate the object from its support structure. In some embodiments, the removal technique may be used at any point after the bonding step.

The terms "foil" and "foil sheet" refer to the metallic sheet used to form each layer in a layer stack. The foil may comprise one or more sub-layers, of which there is at least one structural layer, and optionally some number of interlayers comprising a different metal alloy from the structural layer. In some embodiments, a foil has a thickness in one dimension between 10 μm and 10 mm. In some embodiments, the foil may be patterned corresponding to the design of the object(s) and its support structure(s). In some embodiments, the foil sheet may comprise at least one of Al, Sb, Ba, Be, Bi, B, Cd, Ca, C, Ch, Co, Cu, Gd, Ga, H, Fe, Pb, Li, Mg, Mn, Mo, Nd, Ni, Nb, N, O, Pd, P, K, S, Si, Ag, Na, Sr, S, Ta, Th, Sn, Ti, V, Y, Zn, Zr, or a rare earth metal. In some embodiments, the foil sheet may comprise at least one of aluminum, magnesium, titanium, aluminum alloy, magnesium alloy, or titanium alloy.

A single foil sheet may include at least one structural layer and at least one interlayer material layer. A "structural layer" refers to the core or central portion of the foil. The structural layer typically makes up the majority of the foil. The composition of the alloys used for the structural layer material is described in terms of the primary alloying elements.

The terms "interlayer" and "interlayer material layer" are used interchangeably to refer to the portion of the foil sheet which allows sequential foil sheets to bond. The interlayer may be on the outside of the foil sheet. In some embodiments, the thickness of the interlayer material is less than the thickness of the structural layer material. The composition of the alloys used for the interlayer material is described in terms of the primary alloying elements.

A "layer stack" refers to at least two foil sheets.

A single foil sheet may include at least one support region and at least one object region in some embodiments. "Support" refers to the non-object component of the foil that, when bonded together, forms a holder or jig that conforms to the object exterior and may be used in subsequent post-processing. This holder or jig, formed as a combination of multiple support regions, may be referred to as a "support section." The combination of object regions may be referred to as an "object section." The process of combining may be referred to as "joining."

The term "aluminum" refers to any material that comprises aluminum. For example, a material comprising aluminum may refer to a material of pure molecular aluminum, aluminum that is pure to a standard industrial grade, an alloy of aluminum and at least one other element, or any combination thereof. In the case where an alloy comprises a specific metal such as aluminum, at least the plurality of the alloy composition is the same specific metal. The secondary alloying elements present may be subsequently described.

There are two broad classes of selective inhibition methods, distinguished by the plane where the bonding is inhibited. The term "vertical inhibition methods" refers to the group of methods that involve inhibiting bonding on the boundary(s) between an object region and a support region within a single foil. The second class of inhibition methods, termed "horizontal inhibition methods," encompasses inhibition strategies where the inhibition boundary between the object region and support region of two adjacent foil sheets.

Embodiments relate to methods to manufacture metal objects from constituent metal layers with comparable mechanical properties. In some embodiments, these methods avoid the use of adhesives between layers and instead use high-strength metallic bonds between the constituent layers to form an object. For aluminum parts, some embodiments may use bonding methods such as diffusion bonding, transient liquid phase diffusion bonding, and/or brazing. Specific configurations of materials, such as alloy composition, alloy structure including composites of two or more sub-layers with distinct compositions, and process conditions, such as applied temperature and pressure, may yield strong metallic bonds with shorter and more robust processes useful for manufacturing aluminum parts.

FIG. 1 depicts a side view cross section of a metal laminated object 100 manufactured in accordance with one embodiment. In some embodiments, the object 100 may be manufactured on a print bed 105. In some embodiments, a foil sheet 110 may be deposited onto the print bed 105. The foil sheet 110 may comprise at least one of external support regions 115, internal support regions 120, or object regions 125. In some embodiments, multiple foil sheets may be deposited either directly onto the first foil sheet 110 or may be later added on top of the first foil sheet 110. As discussed in more detail below, the foil sheet 110 may comprise at least one of horizontal inhibition regions 130 or vertical inhibition regions 135.

In some embodiments, the inhibition regions 130, 135 may be formed at the intersection of an object region 125 and a support region 115 by cutting the foil sheet 110 to form at least part of a vertical inhibition region 135 or interrupting the top surface of the foil material of the current foil sheet 110 to form at least part of a horizontal inhibition region 130.

Figure 2:
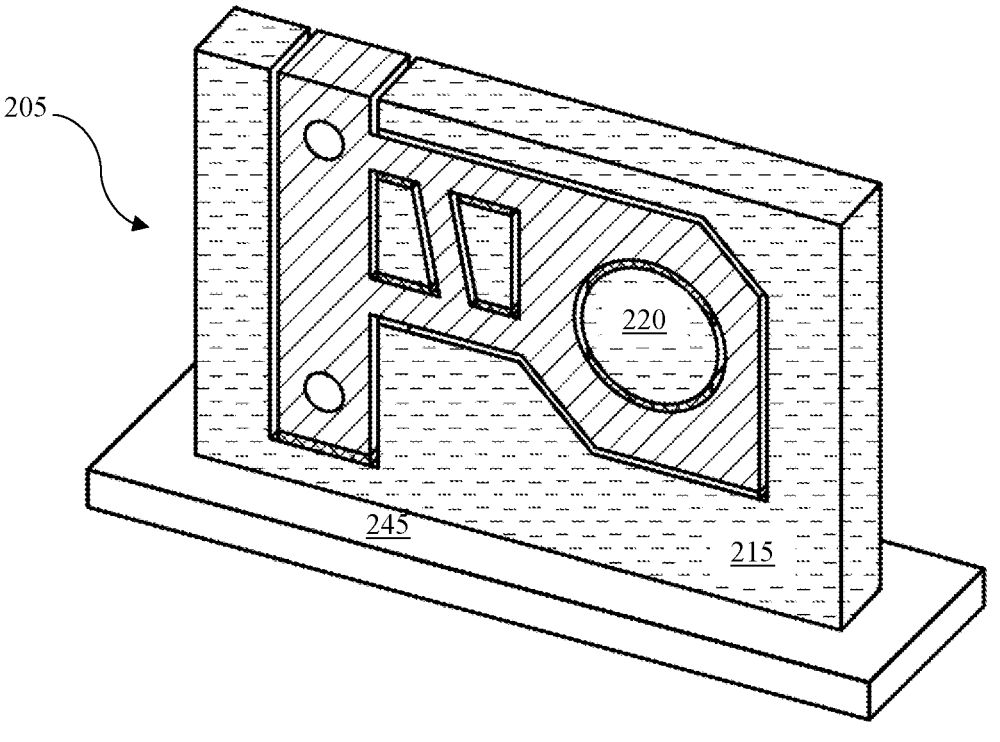
FIG. 2 depicts trimetric and object views of the metal laminated object of FIG. 1.
Figure 2:
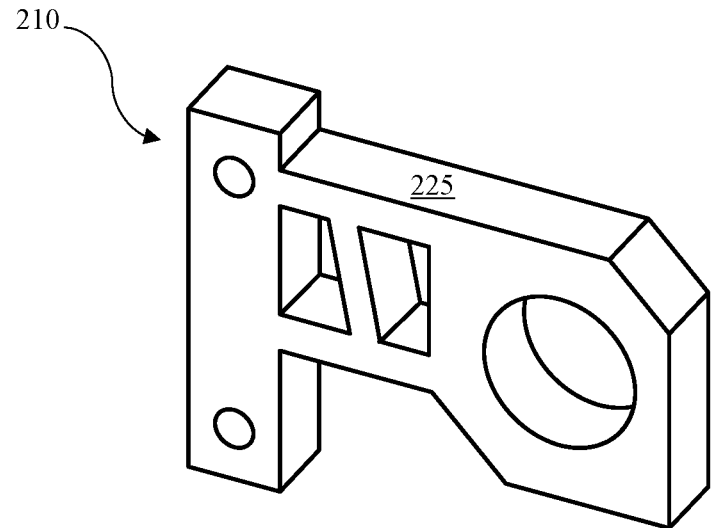

FIG. 2 depicts trimetric 205 and object 210 views of the metal laminated object of FIG. 1. The object may be enclosed in support sections 215, 220 and, as explained in further detail below, those support sections 215, 220 may be removed after the object section 225 is formed to finalize the metal laminated object. In some embodiments, the object section 225 may be offset upward from the bed 245 to ensure the bonding and inhibition processes are consistent throughout the object section 225.

Figure 3:
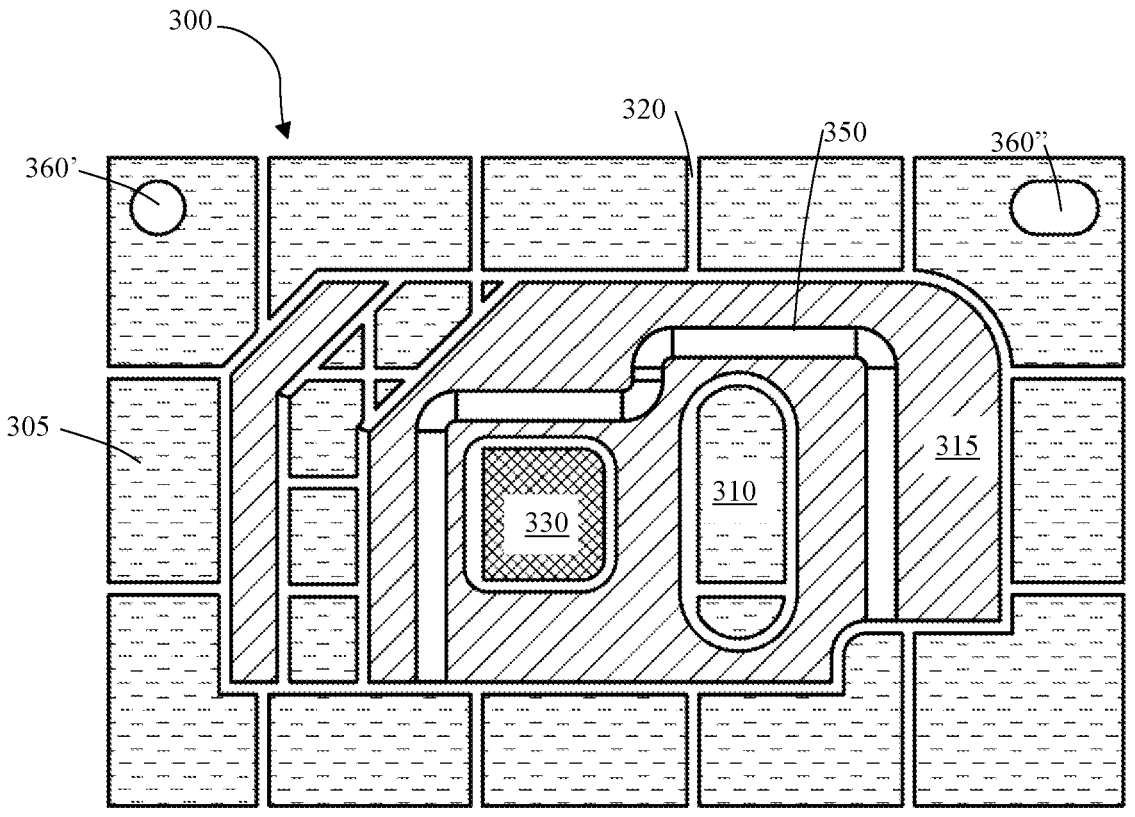
FIG. 3 depicts a top-down cross-section of a metal laminated object manufactured in accordance with one embodiment.

FIG. 3 depicts a top-down cross-section of a foil sheet cut for the manufacture of a metal laminated object 300, in accordance with one embodiment. In some embodiments, each foil sheet of the object 300 may comprise external support regions 305, internal support regions 310, object regions 315, vertical inhibition regions 320, and horizontal inhibition regions 330. In some embodiments, the support regions 305, 310 may be vertically split and may be configured to be separated from the object region 315. In some embodiments, to prevent trapped support regions 305, 310, the large internal channel split distance may be reduced. In some embodiments, an object region 315 may comprise at least one small feature 350 which does not require support. In some embodiments, the small feature 350 may be an internal cooling channel. As discussed in further detail below, some embodiments may comprise a registration feature, such as a pair of holes 360', 360", configured to allow alignment pins to be inserted while the object section, comprising a plurality of object regions 315, is assembled.

Figure 4:
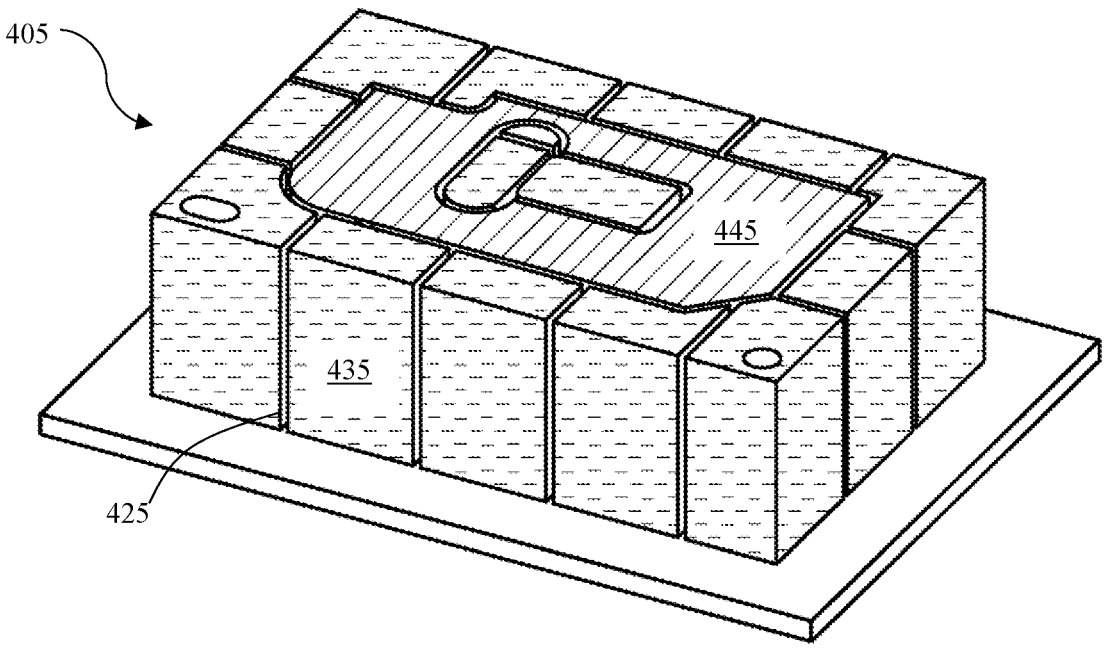
FIG. 4 depicts trimetric and object views of the metal laminated object of FIG. 3.
Figure 4:
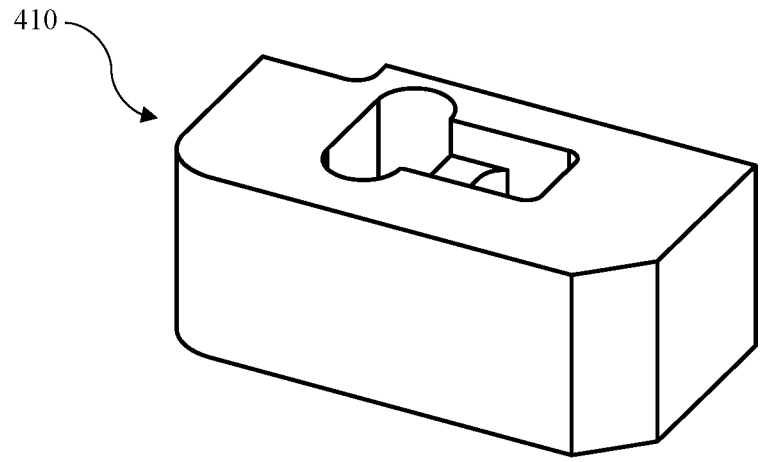

FIG. 4 depicts trimetric 405 and object 410 views of the metal laminated object of FIG. 3. In some embodiments, support sections 435 may be split vertically 425 using a foil cutting tool (not shown), such as a laser, plasma cutter, drag knife, die cutter, milling, or other means. In some embodiments, this split enables easier separation between the support sections 435 and the object sections 445. In some embodiments, the support sections 435 may be split in a grid like pattern to facilitate easy support removal. In some embodiments, support sections 435 may be spaced from 2 mm to 100 mm apart, depending on the size and shape of the object 410. In some embodiments, support sections 435 may be spaced far apart if the object section 445 is a flat shape parallel to the support sections 435. In some embodiments, the support sections 435 may have narrower spacing if the object section 445 has a twisted or complicated shape relative to the support sections 435.

Figure 5:
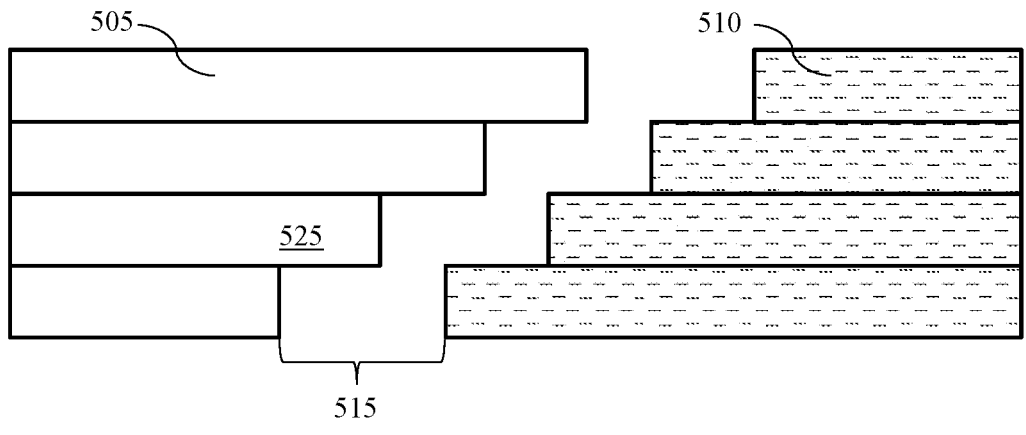
FIG. 5 depicts a cross section of the inhibition region between support regions and object regions in the individual foil sheets in accordance with one embodiment.
Figure 5:

FIG. 5 depicts cross sections of inhibition regions between object regions 505 and support regions 510 in the individual foil sheets in accordance with one embodiment. In some embodiments, the object regions 505 and support regions 510 may have a width 515 wide enough to prevent overhung foil sheets from contacting the previously deposited layer 525. In some embodiments, when the width 515 is wide enough, no horizontal inhibition region is needed.

In some embodiments, an inhibition region 535 may be formed on the previous layer when the cut width is narrow, and the overhung foil sheets do contact the previous layer. The inhibition region 535 is configured to prevent permanent bonding of the object region 550 of the subsequent layer with the support region 555 of the previous layer.

Methods to create horizontal inhibition regions 535 include at least one of deposition of an inhibitory material and ablation of the foil surface. Horizontal inhibition is successful when the inhibitory material is stable at the bonding temperature, preventing the formation of bonds between foil sheets, or alternatively the foil sheets are not in surface contact to form a bond in some embodiments.

In some embodiments, an inhibitory material is selectively deposited on the foil sheet to create a horizontal inhibition region 535. The inhibitory material may be an oxide, ceramic, nitride, non-reactive salt, non-reactive metal, carbide, graphite, hydrocarbon, or other form of carbon in some embodiments. In some embodiments, the inhibitory material may be an oxidizing agent that reacts with the foil to form an oxide layer. In some embodiments, the inhibitory material may be deposited via various methods, including an inkjet, marker, or paste extruder or other deposition technique which would be a recognizable equivalent by someone of ordinary skill in the art. In some embodiments, metal oxides and ceramics may be suspended in a solution to aid in deposition. In some embodiments, deposition aids may comprise at least one of titanium oxide, aluminum oxide, zirconium oxide, carbides, boron nitride, titanium nitride, or carbon. In some embodiments, heat or a laser may be used to promote the formation of an oxide layer on the surface of the foil.

In some embodiments, the horizontal inhibition may be applied to the boundaries between the object regions 550 and support regions 555. In some embodiments, horizontal inhibition may be applied to the support regions 555 after every layer. In some embodiments, the layers may be split horizontally every 3 to 500 layers, depending on the thickness of the foil sheet 560. In some embodiments, a foil sheet 560 may have a thickness of between 50 μm and 500 μm. In some embodiments, support spacing and horizontal inhibition intervals may be adjusted to prevent the object region 505 from becoming mechanically interlocked with the support regions 510.

In some embodiments of horizontal inhibition methods, the surface of the foil is ablated with a laser, leaving a void between subsequent foil sheets. The height of the void space may be greater than the distance the metals expand during the bonding step to prevent contact between the two foil sheets. In some embodiments, surface oxidation caused by the laser ablation will serve to inhibit bonding as if a metal oxide or other ceramic powder were deposited on the surface.

In some embodiments, a horizontal inhibition region 565 may be absent when the angle is steep enough that the overhung foil sheets do not contact the previous layer even though the cut width is narrow.

Figure 6:
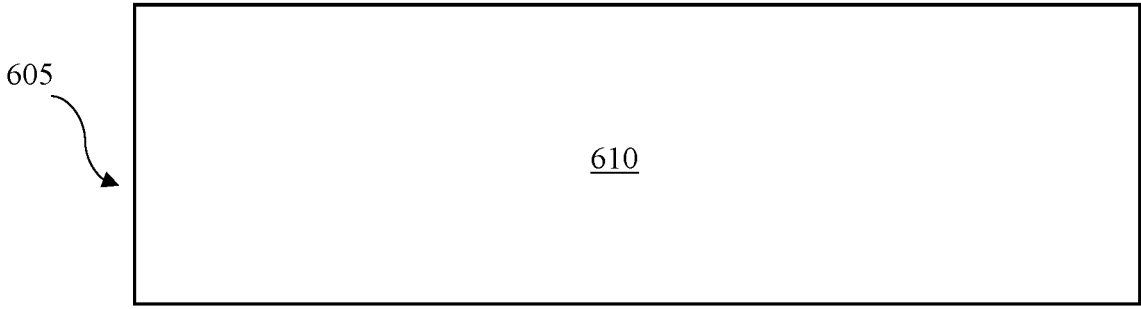
FIG. 6 depicts cross sections of individual foil sheets in accordance with one embodiment.
Figure 6:
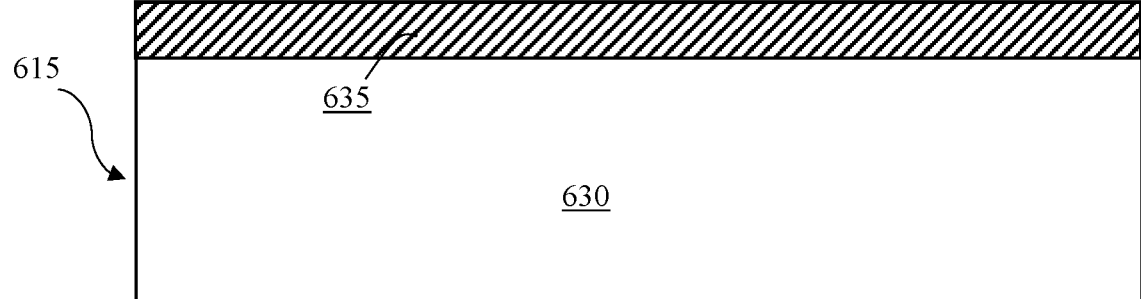
Figure 6:
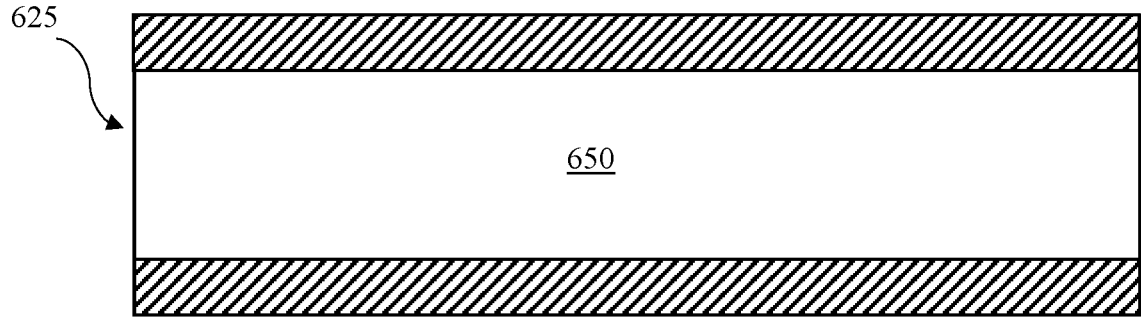

FIG. 6 depicts cross sections of individual foil sheets 605, 615, 625 in accordance with one embodiment. In some embodiments, at least one foil sheet in a stack of foil sheets (not shown) may be comprised exclusively of a structural layer 610. In some embodiments, a foil 615 may comprise a structural layer 630 and a separate interlayer material layer 635 on one surface. In some embodiments, the interlayer material layer 635 may be on top of the structural layer 630. In some embodiments, the interlayer material layer 635 may be on the bottom of the structural layer 630. In some embodiments, a foil sheet 625 may comprise a structural layer 650 and two interlayer material layers on either side of the foil sheet.

In some embodiments, the structural layer 610 may comprise aluminum. In some embodiments, the structural layer 610 may be an aluminum alloy.

In some embodiments, the interlayer material layer may comprise a metal or alloy having a lower melting point than the structural layer. In some embodiments, the interlayer material layer 635 may comprise at least one of aluminum, copper, magnesium, silicon, and zinc. In some embodiments, the metallic elements may be present in a number of different combinations, each composition selected for a particular set of properties that matches its bonding method, such as surface oxide resistance, surface oxide disruption, optimal melting temperatures, and the properties of the liquid state such as wettability over the structural layer. In some embodiments, the two interlayer material layers 635 may comprise different materials. In some embodiments, the two interlayer material layers 635 may be identical.

In some embodiments, the thickness for the interlayer material layer 635 may be 0-40% of the thickness of the structural layer 630. In some embodiments, the thickness for the interlayer material layer 635 may be 0-5% of the thickness of the structural layer 630. In some embodiments, the thickness of the interlayer material layer 635 for a single-clad foil may be 0-20% of the thickness of the structural layer 630. In some embodiments, the thickness of the interlayer material layer 635 for a double-clad foil may be 0-40% of the thickness of the structural layer 630.

In some embodiments, the thickness of the interlayer material layer 635 is less than the thickness of the structural layer 630. In some embodiments, the total thickness of a foil 605 is greater than 50 µm. In other embodiments, the total thickness of a foil 605 is less than 500 µm. The thicknesses of the structural layer 630 and interlayer material layers 635, as well as the ratio of the structural layer thickness to interlayer thickness, are variable and optimized to the specific bonding method in some embodiments.

In some embodiments, the ratio of interlayer material and structural layer material and the compositions of the interlayer materials and structural layer materials are selected so the final mechanical properties of the object resemble most closely that of the structural layer material.

In some embodiments, the specific composition of the interlayer 635 is selected such that the interlayer material melts at a lower temperature than the structural layer 630. In some embodiments, the interlayer material is selected to minimize the melting temperature. In some embodiments, the melting temperature of the interlayer material may be greater than 500° C. and less than 590° C. In some embodiments, the melting temperature of the interlayer material may be below 500° C. In a different subset of these embodiments, the melting temperature of the interlayer material may be below 490° C.

Figure 7:
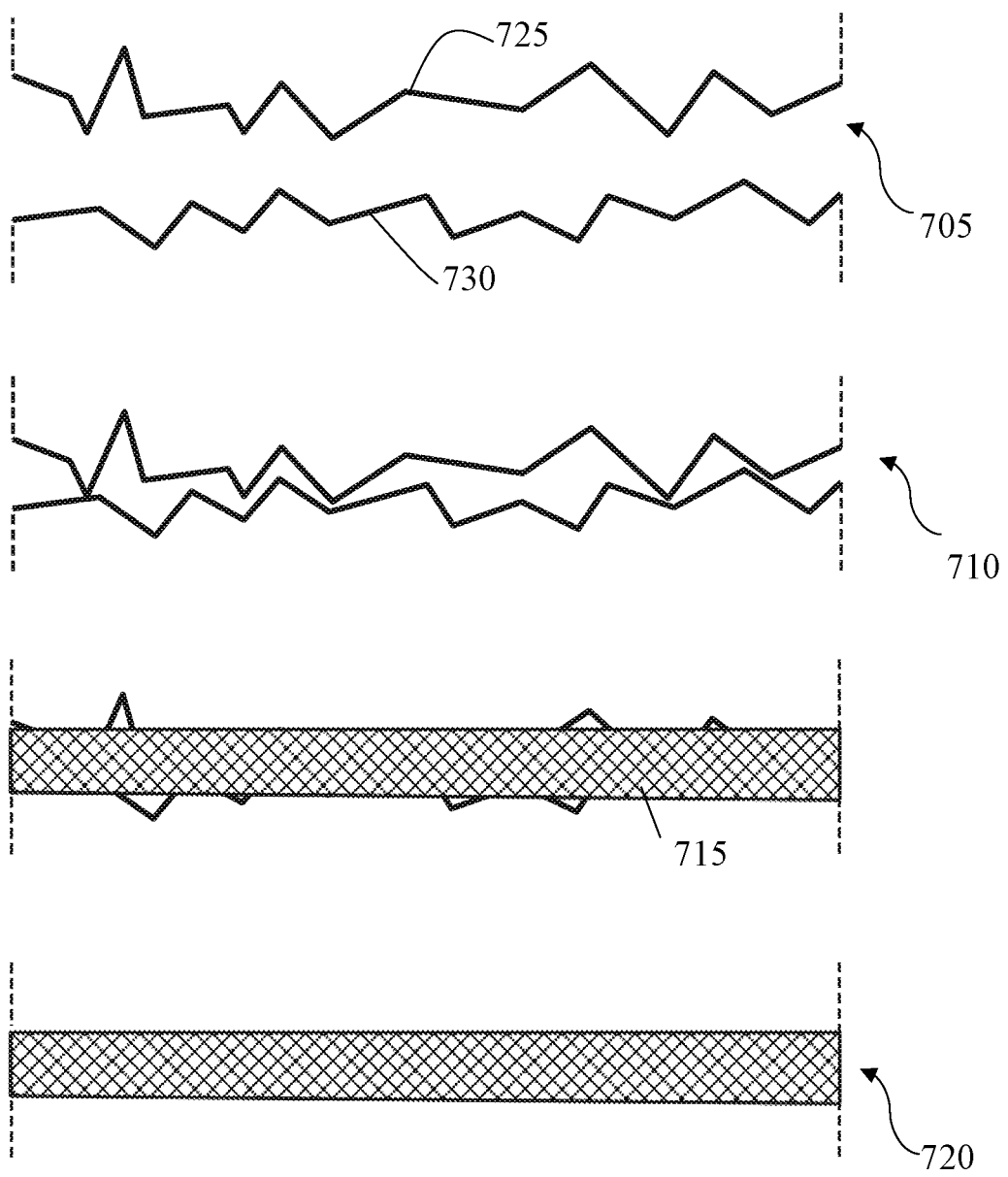
FIG. 7 depicts two surfaces with microscopic surface defects joining together in accordance with one embodiment.

FIG. 7 depicts two surfaces 725, 730 with microscopic surface defects joining together in accordance with one embodiment. In some embodiments, layers within a layer stack may comprise two surfaces with microscopic surface defects 705. In some embodiments, when these surfaces are brought into contact 710 under at least one of applied temperature and pressure, the two microscopic surface defects may begin to match 715. In some embodiments, this matching may form a bonding region 715, comprising surface defect elements from the two surfaces. In some embodiments, the void space between the two surfaces may be eliminated when the two surfaces are matched 720.

The surfaces of the foil sheets may be patterned or textured. In some embodiments, microscopic voids are formed between stacked foil sheets, which when plastically deformed allow bonding to form between surfaces free of surface oxides. The surfaces are roughened, scraped, etched, or otherwise processed to mechanically or chemically remove surface oxides immediately prior to stacking the foil sheets in some embodiments. The patterning or texturing allows the foil sheets to stack and remain in place without the use of an additional adhesive component.

In some embodiments, the surface finish on the foil may comprise a roughened, textured, or patterned surface such that microscopic voids exist between the adjacent sheets of a layer stack.

In some embodiments, the texturing of the surfaces of the foil sheets may promote gas flow between the layers of the stack of foil sheets, allow gases to be purged during bonding, and/or improve the quality or consistency of bonds. If a flux or other protective material is employed to prevent surface oxidation of the structural layer, the channels formed by the surface texturing or patterning may allow that flux or protective material to flow out of the part while under the processing conditions, so that it is not incorporated into the part.

In some embodiments, the surface finish on the foil sheet may comprise a polished smooth surface. In some embodiments, the polished surface may be free of micro defects such that when two foil sheets are stacked, there is minimal to no void space between adjacent layers of a stack of foil sheets.

Figure 8:
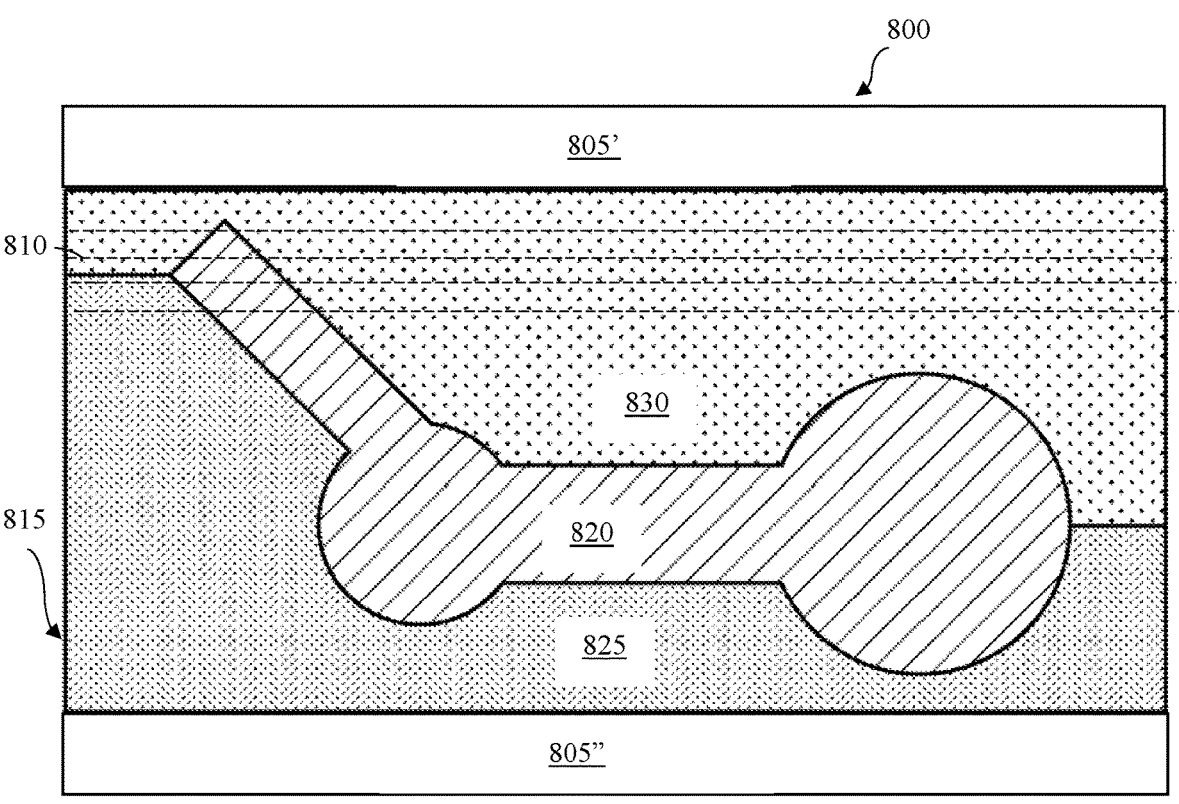
FIG. 8 depicts an additive manufacturing system comprising two plates configured to apply at least one of heat and pressure to layer stack to join layers in the layer stack.

FIG. 8 depicts an additive manufacturing system 800 comprising two plates 805', 805" (collectively 805) configured to apply at least one of heat and pressure to a layer stack 815 to join foil sheets 810 in accordance with one embodiment. Some embodiments may use at least one bonding method to join at least two foil sheets 810 within a layer stack 815.

In some embodiments, the plates 805 may be at least one of pressurized or heated plates. In some embodiments, the plates 805 may be configured to apply at least one of heat or pressure to opposite sides of the layer stack 815. In some embodiments, applying the at least one of heat or pressure increases the temperature of the layer stack 815 to a temperature lower than the melting temperature of the structural layer of the foil sheets 810, such that the at least one of heat or pressure bonds the first foil sheet to the second foil sheet in the layer stack 815.

In some embodiments, to bond the object region 820, the plates 805 may apply even pressure to the layer stack 815. In some embodiments, the layer stack 815 may comprise a full encasing of the object region 820. The full encasing may comprise at least two support regions 825, 830, such that the object region 820 is fully enclosed in the support regions 825, 830.

In some embodiments, the support regions 825, 830 are configured to conduct at least one of heat or pressure through the layer stack 815 from the plates 805. This conduction of heat or pressure promotes bonding of the foil sheets 810 to form a bonded object region 820. In some embodiments, the plates 805 apply at least one of heat or pressure to the support regions 825, 830, which in turn conduct the at least one of heat or pressure to the object region 820. In some embodiments, the support regions 825, 830 may have flat surfaces, such that the plates 805 may evenly apply at least one of pressure or heat across the entire surface. In some embodiments, the support region is a singular support region surrounding the object region 820 and may be used to create a negative of an object. In some embodiments, the bonding process of the object region 820 may occur under oxidizing atmospheres, such as air.

In some embodiments, the system may employ at least one of diffusion bonding, transient liquid diffusion bonding, and/or brazing. In some embodiments, the alloy composition and processing conditions are optimized for efficient diffusion bonding.

In some embodiments, for a diffusion bonding alloy, the structural material in each foil sheet 810 may comprise at least one of aluminum or an aluminum alloy. In some embodiments, each foil sheet 810 may not comprise an interlayer for a pure diffusion bonding alloy. In some embodiments, a flux or some other protective material may be deposited on the structural layer that is evaporated at the bonding temperature and thus disrupts the formation of surface oxides.

Figure 9:
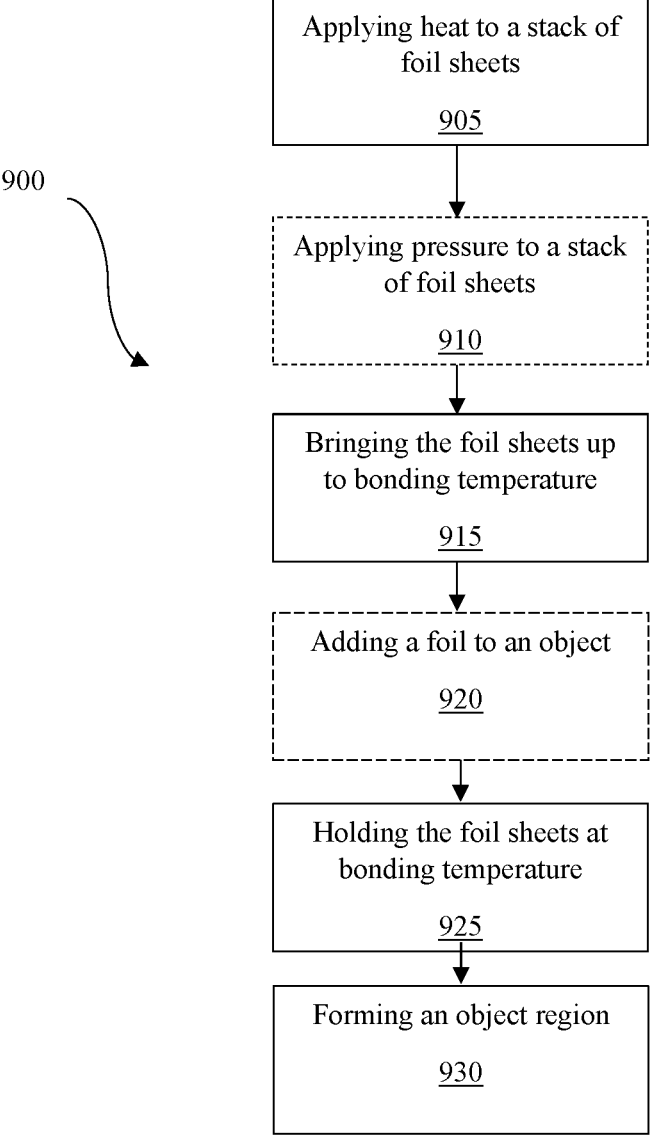
FIG. 9 schematically shows a method for additive manufacturing of an object through diffusion bonding in accordance with one embodiment.

FIG. 9 schematically shows a method 900 for the additive manufacturing of an object through diffusion bonding in accordance with one embodiment. In some embodiments, a method of diffusion bonding 900 comprises applying heat to the stack of foil sheets bring the foil sheets to a bonding temperature (Step 905). In some embodiments, bonding temperature may be less than the melting temperature of the structural layer of the foil sheets and high enough to promote diffusion and bonding between adjacent foil sheets. In some embodiments, the bonding temperature may be less than the temperature of the interlayer of the foil sheets. In some embodiments, at least one plate may apply heat to the foil sheets.

In some embodiments, either simultaneously or concurrently with the heat application, the method may comprise applying pressure to the stack of foil sheets (Step 910). In some embodiments, applying pressure may plastically deform any microscopic surface defects and voids between the surfaces of the foil sheets, forming a solid-solid interface between the surfaces of stacked foil sheets. The applied pressure and surface deformations may also break up surface oxides, further enabling diffusion bonding in some embodiments.

In some embodiments, the stack of foil sheets may be brought up to bonding temperature and optional pressure (Step 915) and held at the bonding temperature and optional pressure (Step 925) until the elements from adjacent structural layers diffuse into each other, joining the stack of foil sheets into an object region (Step 930).

In some embodiments, the method may comprise a sequential diffusion bonding process. In a sequential diffusion bonding process, the method may comprise adding a foil to an object or part of an object at the bonding temperature (Step 920). In some embodiments, the bonding temperature may be is less than the melting temperature of the structural layer material. Alternatively, the foil may be added to a cold foil stack and the stack with the additional foil may be brought to bonding temperature. In some embodiments, a foil is added to an already heated stack and the pressure is applied to the stack. In some embodiments, after the pressure is applied, the pressure is relaxed to add another foil (Step 920).

In some embodiments, the temperature may promote diffusion and bonding between the elements of the structural layer of the added foil and the object, causing the bonding process to occur.

In some embodiments, at least one of the object or a component of a may serve as a heat sink. In some embodiments, the heat sink may generate a temperature gradient across the object for the purpose of selectively promoting diffusion bonding in one sub-region of the object.

In some embodiments, the diffusion process may be repeated until the object is completed.

In some embodiments, the diffusion process is not a sintering application. Sintering results in the part shrinking as metal bonds are formed and non-metal components are burned off. Adhesives used in sintering burn off as the metal bonds form.

Figure 10:
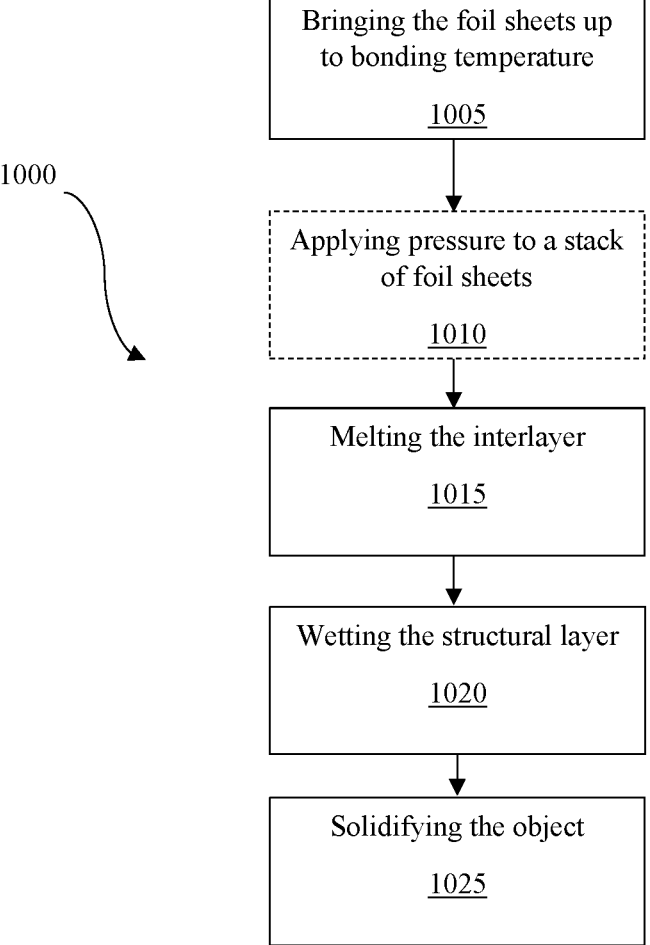
FIG. 10 schematically shows a method for additive manufacturing of an object through transient liquid phase (TLP) diffusion bonding in accordance with one embodiment.

FIG. 10 schematically shows a method 1000 for additive manufacturing of an object through transient liquid phase (TLP) diffusion bonding in accordance with one embodiment.

Some embodiments may optimize the alloy composition and processing conditions for efficient bonding through transient liquid phase (TLP) diffusion bonding under an oxidizing or non-oxidizing atmosphere, or a vacuum.

In some embodiments, the structural material is aluminum or an aluminum alloy. In some embodiments, the structural material may comprise at least one of aluminum, magnesium, titanium, copper, silicon, or zinc. The alloying elements may comprise at least one of magnesium or zinc. In some embodiments, the cladding interlayer may comprise at least one of an aluminum-magnesium alloy, a magnesium-zinc alloy, an alloy of at least two of aluminum, copper, magnesium, silicon, or zinc, or any combination thereof. In some embodiments, at least one of these interlayer alloying elements may serve as an oxide getter, preferentially binding to oxygen at a greater rate than aluminum.

In some embodiments, the aluminum alloy foil sheet may comprise between 20% and 100% aluminum. In some embodiments, the aluminum alloy foil sheet may comprise at least one of Sb, Ba, Be, Bi, B, Cd, Ca, C, Ch, Co, Cu, Ga, Fe, Pb, Li, Mg, Mn, Ni, O, P, K, Sc, Si, Ag, Na, Sr, Sn, Ti, V, Zn, or Zr. In some embodiments, the aluminum alloy foil sheet may comprise more than 50% Cu. In some embodiments, the aluminum alloy foil sheet may comprise more than 40% Fe. In some embodiments, the aluminum alloy foil sheet may comprise more than 40% Mg. In some embodiments, the aluminum alloy foil sheet may comprise more than 40% Ni. In some embodiments, the aluminum alloy foil sheet may comprise more than 40% Zn. In some embodiments, the aluminum alloy foil sheet may comprise more than 60% Si.

In some embodiments, the magnesium alloy foil sheet may comprise between 45% and 100% magnesium. In some embodiments, the magnesium alloy foil sheet may comprise at least one of Al, Be, Ca, Cu, Gd, Fe, Li, Mn, Nd, Ni, Si, Ag, Th, Y, Zn, Zr, or rare earth metals. In some embodiments, the magnesium alloy foil sheet may comprise more than 40% Al.

In some embodiments, the titanium alloy foil sheet may comprise between 70% and 100% titanium. In some embodiments, the titanium alloy foil sheet may comprise at least one of Al, B, C, Ch, Cu, H, Fe, Mn, Mo, Ni, Nb, N, O, Pd, Si, S, Ta, Sn, V, Y, or Zr.

In some embodiments, the melting temperature of the interlayer may be at least 10° C. less than the melting temperature of the structural layer. The melting temperature of the interlayer may be minimized to reduce energy cost and machine complexity of processing. In some embodiments, the melting temperature of the interlayer may be below 500° C.

In some embodiments, the composition of the interlayer may be selected to form a eutectic or partial eutectic system, where the combination of interlayer and structural layer elements melts at a lower temperature than its constituent elements in pure form. The interlayer, when melting, breaks up surface oxides. An element of the interlayer or structural layer material at least partially vaporizes at a temperature less than the melting temperature of the structural layer, enabling the breakup of the surface oxide layer during the bonding process.

In some embodiments, the overall foil thickness is generally between 50 μm and 500 μm. The interlayer may be 1-5% of the thickness of the structural material and may be between 1 μm and 40 μm thick. The interlayer material may be deposited on either one or both sides of the structural material to form a single foil sheet.

In some embodiments, methods may use diffusing elements comprising at least one of Cu, Mn, Zn, or Si. In some embodiments, the diffusing element may comprise at least 0.2% Cu. In some embodiments, the diffusing element may comprise at least 1% Cu. In some embodiments, the diffusing element may comprise at least 2% Cu. In some embodiments, the diffusing element may comprise a maximum of 4% Cu. In some embodiments, the diffusing element may comprise a maximum of 5% Cu. In some embodiments, the diffusing element may comprise a maximum of 6% Cu. In some embodiments, the diffusing element may comprise a maximum of 6.3% Cu.

In some embodiments, the method comprises bringing the stack of foil sheets up to bonding temperature (Step 1005), which is greater than the melting temperature of the interlayer but less than the melting temperature of the structural layer of the constituent foil sheets.

In some embodiments, the method may comprise compressing the stack of foil sheets by applying pressure (Step 1010). In some embodiments, the pressure may be on the order of 1-100 MPa.

In some embodiments, applying at least one of temperature or pressure may cause interlayer to melt, increasing the rate of diffusion of the elements of the structural layer into the interlayer, and the elements of the interlayer into the structural layer (Step 1015). In some embodiments, applied pressure may promote mixing of the elements between the structural layers and interlayers of adjacent foil sheets.

In some embodiments, the molten interlayer fully wets the structural layers, removing the void spaces and breaking apart surface oxides that prevent bonding (Step 1020).

In some embodiments, as the elements of the interlayers and structural layer interdiffuse, the average composition of the stacked foil sheets changes to resemble the final average composition of the object, and the melting temperature increases corresponding to the composition change. In some embodiments, new bonds are formed between metallic components.

In some embodiments, the object solidifies (Step 1025) at a constant temperature because the melting temperature of the bonded part rises above the temperature applied to the part.

The method 1000 may be repeated until the object is completed.

In some embodiments, this process can be accomplished sequentially. In a sequential process, a foil may be added to a part at the bonding temperature, which is greater than the melting temperature of the interlayer material, or a new foil may be added to a cold stack which is then brought up to bonding temperature. In some embodiments, the interlayer of the added foil may melt (Step 1015) to continue the bonding process.

In some embodiments, previously deposited layers are not affected by this process, as their constituent interlayers have already melted, inter-diffused with the structural layers, and bonded so that the part will not melt at the applied bonding temperature.

For eutectic or partial eutectic systems, the previously bound foil sheets in the part will not melt as the composition has shifted away from the low-melting eutectic composition. In some embodiments, either the object or another component of the machine can serve as a heat sink which generates a temperature gradient across the part, for the purpose of selectively promoting diffusion bonding in one sub-region of the part.

The process may be repeated until the part is completed.

In some embodiments, the bonding interface, as the result of surface pre-treatment, alloy composition, and processing conditions, forms a non-linear bonding interface between adjacent foil sheets which ultimately increases object region strength.

Figure 11:
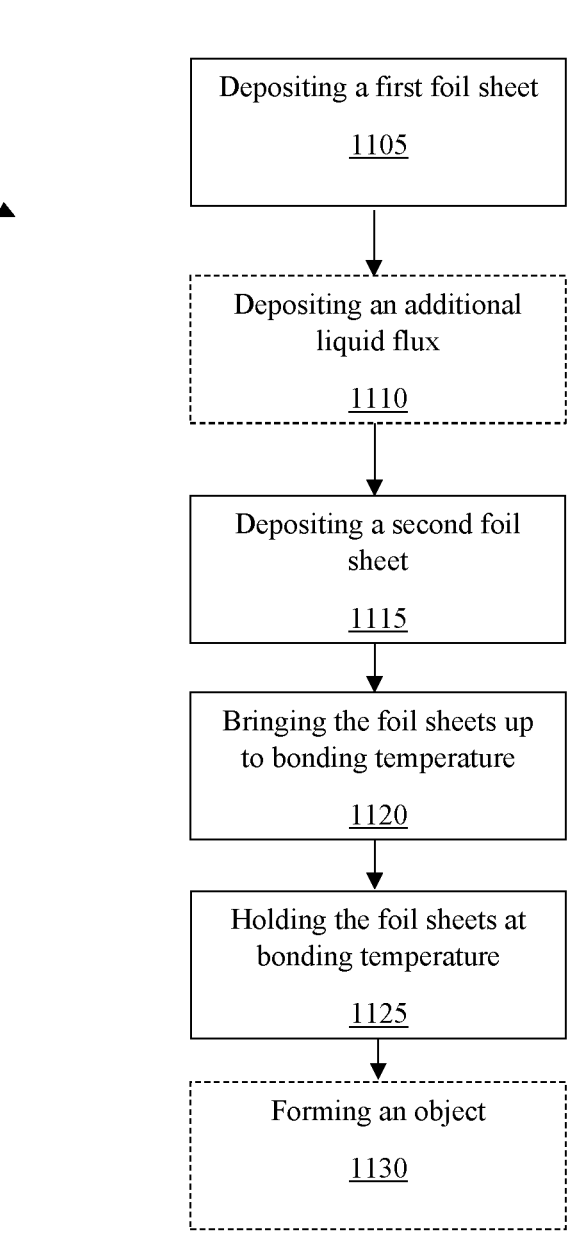
FIG. 11 schematically shows a method for additive manufacturing of an object through brazing in accordance with one embodiment.

FIG. 11 schematically shows a method 1100 for additive manufacturing of an object through brazing in accordance with one embodiment. In some embodiments, brazing is used to optimize the alloy composition and processing conditions for bonding.

Similar to the TLP diffusion foil sheets, the structural material for brazing may comprise aluminum or an aluminum alloy. In some embodiments, the alloy may comprise magnesium, zinc, or any combination thereof. The cladding interlayer may comprise an aluminum-magnesium alloy, a magnesium-zinc alloy, an alloy of at least two of aluminum, copper, magnesium, silicon, or zinc, or any combination thereof. At least one of these interlayer alloying elements may serve as an oxide getter. In some embodiments, an oxide getter may preferentially bind to oxygen at a greater rate than aluminum. In some embodiments, the composition of the interlayer alloying elements may be selected to minimize the impact of surface oxides on the bonding process under oxidizing atmospheres. This process may include the greater quantities of elements that disrupt surface oxides or preferentially bind oxygen.

In some embodiments, the method comprises depositing a first foil sheet (Step 1105). In some embodiments, the first foil sheet may be deposited onto a print bed. In some embodiments, the first foil sheet may be deposited onto a foil sheet. The first foil sheet may comprise an object region and at least one support region connected to the object region. In some embodiments, the method further comprises depositing a second foil sheet (Step 1115). In some embodiments, the foil sheets may comprise at least one interlayer and at least one structural layer.

In some embodiments, the foil sheets may be deposited using additive manufacturing. In some embodiments, an additional liquid flux may be deposited before depositing the second foil sheet (Step 1110).

In some embodiments, the additional liquid flux may be applied into the void space between the layers of the part to increase the wettability of the interlayer material over the surface of the structural layers when molten. This flux can be decomposed at the bonding temperature or is otherwise pushed out of the void spaces under pressure. In some embodiments, the additional liquid flux may clean the oxygen off of the light alloy part, comprising at least one of an aluminum alloy, magnesium alloy, or titanium alloy. In some embodiments, a light alloy may comprise an aluminum, magnesium, or titanium alloy.

In some embodiments, the foil sheets may be brought up to the bonding temperature (Step 1120). In some embodiments, bonding temperature is greater than the melting temperature of the interlayer but less than the melting temperature of the structural layer of the foil sheets.

In some embodiments, the foil sheets may be held at this bonding temperature for a fixed period of time (Step 1125). In some embodiments, holding the foil sheets at a bonding temperature may allow the interlayers to melt, which increases the rate of diffusion of the elements of the structural layer into the interlayer, and correspondingly the elements of the interlayer into the structural layer.

This process causes the formation of metallic bonds between the adjacently stacked foil sheets, forming an object (Step 1130).

In some embodiments, the brazing process may be accomplished sequentially. In a sequential brazing process, a foil may be added to a sub-assembly or object comprising several bonded foil sheets. In some embodiments, an additional liquid flux may be applied to the void space between the added foil sheet and the object.

In some embodiments, the added foil and the part may be brought up to the bonding temperature, which is greater than the melting temperature of the interlayer of the added foil but less than the melting temperature of the structural layer of the added foil, as well as the less than the melting temperature of the alloy that makes up the part (Step 1120).

In some embodiments, the added foil and the part may be held at this bonding temperature for a fixed period of time (Step 1125), which melts the interlayer of the added foil and the bonding process described above occurs.

In some embodiments, the previously deposited layers may not be affected by this process, as their constituent interlayers have already melted, inter-diffused with the structural layers, and bonded so that the object will not melt at the applied bonding temperature.

For eutectic or partial eutectic systems, the previously bound foil sheets in the part will not melt as the composition has shifted away from the low-melting eutectic composition. Either the part or another component of the machine can serve as a heat sink which generates a temperature gradient across the part, for the purpose of selectively promoting brazing in one sub-region of the part.

Figure 12:
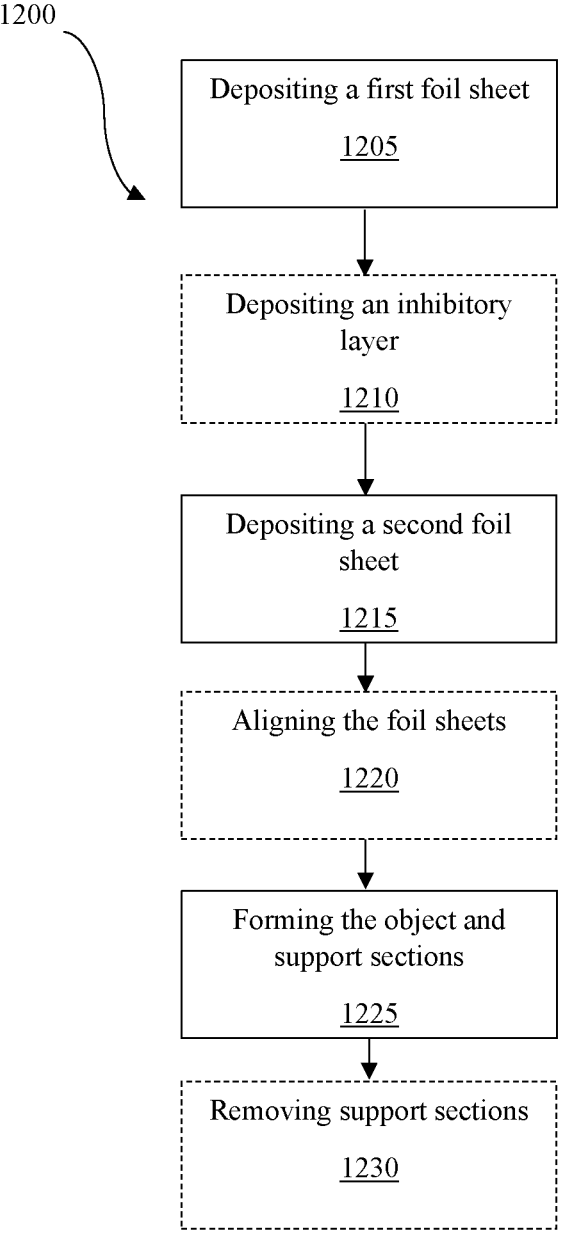
FIG. 12 schematically shows a method for the additive manufacturing of an object in accordance with one embodiment.

FIG. 12 schematically shows a method 1200 for the additive manufacturing of an object in accordance with one embodiment. In some embodiments, the method comprises depositing a first foil sheet (Step 1205). In some embodiments, the first foil sheet may be deposited onto a print bed. In some embodiments, the first foil sheet may be deposited onto a foil sheet. The first foil sheet may comprise an object region and at least one support region connected to the object region. In some embodiments, the method further comprises depositing a second foil sheet (Step 1215). In some embodiments, the foil sheets may be deposited using additive manufacturing. In some embodiments, an inhibitory layer may be deposited before depositing the second foil sheet (Step 1210). In some embodiments, the inhibitory layer may be deposited simultaneously with depositing a foil sheet. In some embodiments, the inhibitory material may comprise at least one of oxide, ceramic, nitride, non-reactive salt, non-reactive metal, carbide, graphite, hydrocarbon, or carbon.

In some embodiments, the method comprises aligning the foil sheets (Step 1220). In some embodiments, the layers may have a registration feature within a support region or the object region. In some embodiments, the method may align the registration features and, by aligning the registration features, the foil sheets may be aligned. For example, in some embodiments, the registration features may be at least one of a hole, tab, or slit and the aligning step may comprise temporarily threading a pin through the registration features to align the foil sheets.

In some embodiments, the method comprises forming an object with the foil sheets (Step 1225). In some embodiments, the object comprises the object regions in the foil sheets. In some embodiments, forming the object comprises spot welding the foil sheets together. In some embodiments, forming the object comprises applying at least one of heat and pressure to the foil sheets. In some embodiments, after the foil sheets are aligned, the object regions in each foil sheet are attached to the object regions in the other foil sheets to form an object section. Additionally, at least some of the support regions in each foil sheets are attached to at least some of the support regions in the other foil sheets to form support sections. In some embodiments, the support sections are configured to evenly distribute temperature and pressure to the object section and through the first foil sheet and the second foil sheet. In some embodiments, the support sections are configured to prevent deformation of the object section after initial deposition.

In some embodiments, the method further comprises removing the support sections (Step 1230). In some embodiments, the support sections may be subdivided to facilitate piecewise removal from the object. In some embodiments, the support sections may be removed by breaking connection bridges from the object.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

What is claimed is:

1. A method for additive manufacturing of an object, the method comprising:

depositing a first foil sheet;

forming, by cutting through the first foil sheet, at least one vertical inhibition region in the first foil sheet that separates the first foil sheet into at least one object region and at least one support region and defines a boundary between the at least one object region and the at least one support region in the first foil sheet;

forming, through selective depositing of an inhibitory material on a selected area of the top surface of the first foil sheet, at least one horizontal inhibition region on the first foil sheet;

depositing a second foil sheet onto the first foil sheet, wherein the first foil sheet and the second foil sheet each comprise a structural layer and the at least one horizontal inhibition region on the first foil sheet inhibits bonding between object and support regions of adjacent surfaces of the first foil sheet and the second foil sheet in the selected area of the at least one horizontal inhibition region;

forming, by cutting through the second foil sheet, at least one vertical inhibition region in the second foil sheet that separates the second foil sheet into at least one object region and at least one support region and defines a boundary between the at least one object region and the at least one support region in the second foil sheet;

forming a layer stack comprising the first foil sheet and the second foil sheet, the layer stack comprising an object section and at least one support section configured to enclose the object section in the layer stack, and the object section and the at least one support section are separated by at least one vertical inhibition region that defines a boundary between the object section and the at least one support section; and applying at least one of heat or pressure to opposite sides of the layer stack with a first plate and a second plate, wherein:

applying the at least one of heat or pressure increases the temperature of the layer stack to a temperature lower than the melting temperature of the structural layer;

the at least one of heat or pressure bonds the first foil sheet to the second foil sheet in the layer stack outside the area of the at least one horizontal inhibition region;

the first plate and the second plate are in contact with the at least one support section;

the at least one support section is configured to conduct the at least one of heat or pressure through the layer stack to the object section; and wherein the at least one support section is solid and configured to prevent deformation of the object section after initial deposition; and removing the at least one support section from the object section after said bonding is completed.

2. The method of claim 1, wherein the first foil sheet is bonded to the second foil sheet using transient liquid phase diffusion bonding.

3. The method of claim 1, wherein the first foil sheet is bonded to the second foil sheet using brazing.

4. The method of claim 1, wherein the first plate and the second plate are not in contact with the object section.

5. The method of claim 1, wherein:

at least one of the first foil sheet and the second foil sheet comprise an interlayer material; and the temperature of the layer stack is less than the melting temperature of the interlayer material layer when bonding the first foil sheet to the second foil sheet.

6. The method of claim 1, wherein no powder is deposited on the first foil sheet or the second foil sheet to promote bonding.

7. The method of claim 1, wherein the structural layer comprises at least one of aluminum, magnesium, titanium, aluminum alloy, magnesium alloy, or titanium alloy.

8. The method of claim 1, wherein the first plate and the second plate are heated or pressurized plates.

9. The method of claim 1, further comprising sanding at least one of the first foil sheet or the second foil sheet before bonding the first foil sheet to the second foil sheet.

10. The method of claim 1, wherein:

the first foil sheet comprises a first object region and a first support region connected to the first object region;

the second foil sheet comprises a second object region and a second support region connected to the second object region; and the method further comprises:

attaching the second object region to the first object region; and attaching the first support region to the second support region, the first support region and the second support region comprising the at least one support section.

11. The method of claim 1, wherein:

the layer stack comprises a top layer, at least one middle layer, and a bottom layer;

the at least one middle layer comprises an object region and a first support region;

the top layer is a second support region;

the bottom layer is a third support region; and the first support region, the second support region, and the third support region are configured to enclose the object region in the layer stack.

12. The method of claim 1, wherein:

at least one of the first foil sheet and the second foil sheet comprise an interlayer material layer; and the temperature of the layer stack is greater than the melting temperature of the interlayer material layer when bonding the first foil sheet to the second foil sheet.

13. The method of claim 12, wherein the interlayer material layer comprises at least one of aluminum, copper, lithium, magnesium, silicon, zinc, aluminum alloy, magnesium alloy, or titanium alloy.

14. The method of claim 1, wherein at least one of the first foil sheet or the second foil sheet is a patterned foil sheet, wherein the pattern is configured to create microscopic voids between the foil sheets in the layer stack.

15. The method of claim 14, further comprising deforming the microscopic voids and bonding the first foil sheet to the second foil sheet without surface oxides.

16. A system for manufacturing an object, the system comprising:

an additive manufacturing device configured to:

deposit a first foil sheet;

form, by cutting through the first foil sheet, at least one vertical inhibition region in the first foil sheet that separates the first foil sheet into at least one object region and at least one support region and defines a boundary between the at least one object region and the at least one support region in the first foil sheet;

form, through the selective depositing of an inhibitory material on a selected area of the top surface of the first foil sheet, at least one horizontal inhibition region on the first foil sheet;

deposit a second foil sheet onto the first foil sheet, wherein the first foil sheet and the second foil sheet each comprise a structural layer and the at least one horizontal inhibition region on the first foil sheet inhibits bonding between object and support regions of adjacent surfaces of the first foil sheet and the second foil sheet in the selected area of the at least one horizontal inhibition region;

form, by cutting through the second foil sheet, at least one vertical inhibition region in the second foil sheet that separates the second foil sheet into at least one object region and at least one support region and defines a boundary between the at least one object region and the at least one support region in the second foil sheet;

form a layer stack comprising the first foil sheet and the second foil sheet, the layer stack comprising an object section and at least one support section configured to enclose the object section in the layer stack, and the object section and the least one support section are separated by at least one vertical inhibition region that defines a boundary between the object section and the at least one support section; and remove the at least one support section from the object section after said bonding is completed; and at least one of heated or pressurized plates configured to:

contact the at least one support section; and apply at least one of heat or pressure to opposite sides of the layer stack, wherein:

the at least one support section is configured to conduct the at least one of heat or pressure through the layer stack to the object section;

applying the at least one of heat or pressure increases the temperature of the layer stack to a temperature lower than the melting temperature of the structural layer; and the at least one of heat or pressure bonds the first foil sheet to the second foil sheet in the layer stack outside the area of the at least one horizontal inhibition region; and the at least one support section is solid and configured to prevent deformation of the object section after initial deposition.

17. The system of claim 16, wherein the at least one of heat or pressure bonds the first foil sheet to the second foil sheet in the layer stack using transient liquid phase diffusion bonding.

18. The system of claim 16, wherein the at least one of heat or pressure bonds the first foil sheet to the second foil sheet in the layer stack using brazing.

19. The system of claim 16, wherein at least one of heated or pressurized plates are not in contact with the object section.

20. The system of claim 16, wherein:

at least one of the first foil sheet and the second foil sheet comprise an interlayer material; and the temperature of the layer stack is less than the melting temperature of the interlayer material layer when the first foil sheet bonds to the second foil sheet.

21. The system of claim 16, wherein the structural layer comprises at least one of aluminum, magnesium, titanium, aluminum alloy, magnesium alloy, or titanium alloy.

22. The system of claim 16, further comprising a sander configured to sand at least one of the first foil sheet or the second foil sheet.

23. The system of claim 16, wherein:

the first foil sheet comprises a first object region and a first support region connected to the first object region;

the second foil sheet comprises a second object region and a second support region connected to the second object region; and the additive manufacturing device is further configured to:

attach the second object region to the first object region; and attach the first support region to the second support region, the first support region and the second support region comprising the at least one support section.

24. The system of claim 16, wherein:

the layer stack comprises a top layer, at least one middle layer, and a bottom layer;

the at least one middle layer comprises an object region and a first support region;

the top layer is a second support region;

the bottom layer is a third support region; and the first support region, the second support region, and the third support region are configured to enclose the object region in the layer stack.

25. The system of claim 16, wherein:

at least one of the first foil sheet and the second foil sheet comprise an interlayer material layer; and the temperature of the layer stack is greater than the melting temperature of the interlayer material layer when the first foil sheet bonds to the second foil sheet.

26. The system of claim 25, wherein the interlayer material layer comprises at least one of aluminum, copper, lithium, magnesium, silicon, zinc, aluminum alloy, magnesium alloy, or titanium alloy.

27. The system of claim 16, wherein no powder is deposited on the first foil sheet or the second foil sheet to promote bonding.

28. The system of claim 27, wherein at least one of the first foil sheet or the second foil sheet is a patterned foil sheet, wherein the pattern is configured to create microscopic voids between the foil sheets in the layer stack.

29. The system of claim 28, wherein:

the additive manufacturing device is configured to deform the microscopic voids; and the at least one of heated or pressurized plates are configured to bond the first foil sheet to the second foil sheet without surface oxides.

\* \* \* \* \*